United States Patent
Underwood et al.

(10) Patent No.: US 9,237,428 B2
(45) Date of Patent: Jan. 12, 2016

(54) EXTENDED MESSAGING PLATFORM

(75) Inventors: John Anthony Underwood, Makati (PH); Christopher Edward Keys, Makati (PH); Markku Kero, Muntinlupa (PH); Rainer Leinonen, Makati (PH)

(73) Assignee: 3RD BRAND PTE. LTD., Singapore (SG)

( * ) Notice: Subject to any disclaimer, the term of this patent is extended or adjusted under 35 U.S.C. 154(b) by 86 days.

(21) Appl. No.: 12/866,025

(22) PCT Filed: Jun. 30, 2009

(86) PCT No.: PCT/SG2009/000238
§ 371 (c)(1),
(2), (4) Date: Aug. 3, 2010

(87) PCT Pub. No.: WO2010/002354
PCT Pub. Date: Jan. 7, 2010

(65) Prior Publication Data
US 2010/0325470 A1 Dec. 23, 2010

(30) Foreign Application Priority Data
Jul. 4, 2008 (SG) .................................. 200805072

(51) Int. Cl.
*H04L 12/54* (2013.01)
*H04W 4/14* (2009.01)
(Continued)

(52) U.S. Cl.
CPC ................. *H04W 4/14* (2013.01); *H04L 51/14* (2013.01); *H04L 51/30* (2013.01); *H04L 69/14* (2013.01); *H04L 51/04* (2013.01); *H04L 51/38* (2013.01)

(58) Field of Classification Search
CPC ........... H04W 4/02; H04W 4/20; H04W 4/12; H04L 12/5825; H04L 12/5835; G06Q 10/02; G06Q 10/1093; G06Q 10/109
USPC .......................... 370/225, 328, 329, 338, 401; 455/414.3, 414.4, 418, 466
See application file for complete search history.

(56) References Cited

U.S. PATENT DOCUMENTS 5,025,252 A * 6/1991 DeLuca et al. ................ 340/7.41
5,742,668 A * 4/1998 Pepe et al. ...................... 455/415
(Continued)

FOREIGN PATENT DOCUMENTS

| CN | 1738298 A | 2/2006 |
|---|---|---|
| CN | 1817014 A | 8/2006 |

(Continued)

OTHER PUBLICATIONS

International Search Report, mailing date Sep. 15, 2009, for corresponding International Application No. PCT/SG2009/000238.
(Continued)

*Primary Examiner* — Brian O'Connor
(74) *Attorney, Agent, or Firm* — Intellectual Property Law Group LLP (57) ABSTRACT

A messaging system, including at least one server configured to receive a message from a originating device for delivery to at least one recipient device via a first delivery channel; wherein the at least one server is further configured to select an alternate delivery channel in the event that delivery of the message via the first delivery channel cannot be effected. There is also a method for routing messages including the steps of receiving, at a server, a message from an originating device for delivery to at least one recipient device; forwarding the message to the at least one recipient device via a first delivery channel; awaiting receipt of an acknowledgement message from said at least one recipient device, and in the event that no acknowledgment message is received, the server resending the message to said at least one recipient device via an alternate delivery channel.

33 Claims, 2 Drawing Sheets

(51) Int. Cl.
*H04L 29/06* (2006.01)
*H04L 12/58* (2006.01)

(56) References Cited

U.S. PATENT DOCUMENTS

| | | | |
|---|---|---|---|
| 5,878,352 A | 3/1999 | Souissi et al. | |
| 5,966,663 A * | 10/1999 | Gleason | 455/466 |
| 6,014,429 A * | 1/2000 | LaPorta et al. | 379/88.15 |
| 6,263,212 B1 * | 7/2001 | Ross et al. | 455/466 |
| 6,701,378 B1 * | 3/2004 | Gilhuly et al. | 709/249 |
| 6,766,162 B1 * | 7/2004 | Beamish | 455/412.1 |
| 6,807,423 B1 * | 10/2004 | Armstrong et al. | 455/440 |
| 7,020,479 B2 * | 3/2006 | Martschitsch | 455/466 |
| 7,020,480 B2 * | 3/2006 | Coskun et al. | 455/466 |
| 7,024,178 B2 * | 4/2006 | Uchimura | 455/412.1 |
| 7,190,956 B2 * | 3/2007 | Dorenbosch et al. | 455/435.1 |
| 7,317,699 B2 * | 1/2008 | Godfrey et al. | 370/328 |
| 7,418,265 B2 * | 8/2008 | Hardy et al. | 455/445 |
| 7,583,958 B2 * | 9/2009 | Coskun et al. | 455/414.4 |
| 7,831,707 B2 * | 11/2010 | Bardsley | G06Q 30/06 709/206 |
| 7,840,207 B2 * | 11/2010 | Adams | H04L 12/5855 455/154.2 |
| 7,853,652 B2 * | 12/2010 | McCarty | 709/206 |
| 7,865,559 B1 * | 1/2011 | Day | H04M 3/53333 709/206 |
| 7,924,792 B2 * | 4/2011 | Shen et al. | 370/338 |
| 7,962,623 B2 * | 6/2011 | Undery et al. | 709/227 |
| 7,970,381 B2 * | 6/2011 | Chesnutt | H04L 12/5895 455/410 |
| 8,060,067 B2 * | 11/2011 | Tarleton et al. | 455/414.4 |
| 8,176,086 B2 * | 5/2012 | John et al. | 707/802 |
| 8,463,649 B2 * | 6/2013 | Lutnick et al. | 705/16 |
| 8,539,361 B2 * | 9/2013 | Hardy | H04L 51/22 709/206 |
| 8,582,743 B2 * | 11/2013 | Teng et al. | 379/204.01 |
| 8,655,714 B2 * | 2/2014 | Weir et al. | 705/7.13 |
| 2002/0120697 A1 | 8/2002 | Generous et al. | |
| 2002/0198946 A1 | 12/2002 | Wang et al. | |
| 2003/0110224 A1 * | 6/2003 | Cazier et al. | 709/206 |
| 2004/0019695 A1 * | 1/2004 | Fellenstein et al. | 709/239 |
| 2004/0061718 A1 | 4/2004 | Fitzpatrick et al. | |
| 2005/0013426 A1 | 1/2005 | Ooki | |
| 2005/0207379 A1 | 9/2005 | Shen et al. | |
| 2006/0117050 A1 * | 6/2006 | John et al. | 707/101 |

FOREIGN PATENT DOCUMENTS

| | | |
|---|---|---|
| JP | H02-311048 | 12/1990 |
| JP | 2003-526989 | 9/2003 |
| JP | 2005-018194 | 1/2005 |
| JP | 2010-507981 | 3/2010 |
| RU | 2253949 | 6/2005 |
| WO | WO97/26709 A1 | 7/1997 |
| WO | WO97/26767 A1 | 7/1997 |
| WO | WO 2005/041549 | 5/2005 |
| WO | WO 2005-104465 | 11/2005 |
| WO | WO 2008/051506 | 5/2008 |

OTHER PUBLICATIONS

International Preliminary Report on Patentability with attached Article 34 Amendments, mailing date Mar. 17, 2010, for corresponding International Application No. PCT/SG2009/000238.

Russian Decision to Grant dated Mar. 22, 2012 with English Translation for corresponding Application No. RU 2010140041 now Patent No. RU 2459240.

Japanese Decision to Grant dated Mar. 12, 2013 for corresponding Application No. JP 2011-516229.

* cited by examiner

Fig. 1

Fig. 2

EXTENDED MESSAGING PLATFORM

CROSS-REFERENCE TO RELATED APPLICATIONS

This application is a U.S. National Phase application, under 35 U.S.C. §371, of International Application no. PCT/SG2009/000238, with an international filing date of Jun. 30, 2009 and claims benefit of Singapore Application no. 200805072-6 filed on Jul. 4, 2008, and which are hereby incorporated by reference for all purposes.

FIELD OF THE INVENTION

The present application relates to systems and methods for providing extended messaging services. In particular although not exclusively the present invention relates to providing extended messaging and/or file sharing services within a mobile communications network.

DISCUSSION OF THE BACKGROUND ART

The most prolific form of messaging employed in mobile communication systems is the Short Message Service (SMS). Typically Messages are sent from the originating device to a Short Message Service Centre (SMSC) which provides a store-and-forward mechanism. Transmission of short messages between the SMSC and the handset is done using the Mobile Application Part (MAP) of the SS7 protocol. Messages are sent with the MAP mo- and mt-ForwardSM operations, whose payload length is limited by the constraints of the signalling protocol to precisely 140 octets (140 octets=140*8 bits=1120 bits). Short messages can be encoded using a variety of alphabets: the default GSM 7-bit alphabet (shown below), the 8-bit data alphabet, and the 16-bit UTF-16/UCS-2 alphabet.

Depending on which alphabet the subscriber has configured in the handset, this leads to the maximum individual Short Message sizes of 160 7-bit characters, 140 8-bit characters, or 70 16-bit characters (including spaces). Support of the GSM 7-bit alphabet is mandatory for GSM handsets and network elements, [15] but characters in languages such as Arabic, Chinese, Korean, Japanese or Cyrillic alphabet languages (e.g. Russian) must be encoded using the 16-bit UCS-2 character encoding (Unicode). Routing data and other metadata is additional to the payload size.

If a recipient is not reachable, the SMSC queues the message for later retry. Some SMSCs also provide a "forward and forget" option where transmission is tried only once. Accordingly message delivery is best effort, so there are no guarantees that a message will actually be delivered to its recipient and delay or complete loss of a message is not uncommon, particularly when sending between networks.

In recent years additional message services such as instant message and email have migrated to the mobile environment. In the standard desktop environment Instant Messaging (IM) provided real-time text-based or near real-time communication between two or more participants over a network. Thus the key distinction between IM from such services as email is the perceived synchronicity of the communication between users, messaging is done in real or near real-time. Instant messages are typically logged in a local message history which closes the gap to the persistent nature of emails and facilitates quick exchange of information like URLs or document snippets (which can be unwieldy when communicated via telephone). IM allows effective and efficient communication, featuring immediate receipt of acknowledgment or reply.

Mobile Instant Messaging (MIM) differs slightly to that of standard desktop IM application. MIM is a presence enabled messaging service which attempts to transpose the desktop messaging experience to the usage scenario of being on the move. While several of the core ideas of the desktop experience on one hand apply to a connected mobile device, others do not. For example some of the form factor and mobility related differences need to be taken into account in order to create a really adequate, powerful and yet convenient mobile experience such as bandwidth, memory size, availability of media formats, keypad based input, screen output, CPU performance and battery power are core issues that desktop device users and even nomadic users with connected network.

As mentioned above as mobile data networks can be unreliable and messages may go missing (message delivery being best effort). Existing mobile Instant Messaging (IM) "gateway" products treat IM messages as "casual chat". As such there is no guarantee that the message will be delivered to the intended recipient as MIM do not see the loss of a message as being of consequence. As such the current implementations of MIM are not readily suited to a business environment or other applications where the delivery of information is critical.

As discussed above most existing messaging systems (e.g. SMS) offer limited storage capacity. In the case of SMS a local PC backup/archive may be required to provide any sort of message backup capability and then the process is manual in nature. A user wishing to save messages must perform this manual process prior to deleting messages on their mobile device to free up space for new messages.

Accordingly there is a need to provide a reliable messaging solution that will be accepted by a casual as well as a business or critical user. It would also be advantageous to provide a facility to enable users to backup messages sent and received for later review.

SUMMARY OF THE INVENTION

Disclosure of the Invention

Accordingly in one aspect of the present invention there is provided an extended message system said system including:
  at least one server configured to receive a message from a originating device for delivery to at least one recipient device via a first delivery channel; and
  wherein the at least one server is further configured to select an alternate delivery channel in the event that delivery of the message via the first delivery channel cannot be effected;
  Alternatively the originating device may be configured to select an alternate delivery channel in the event that the delivery of the message via the first delivery channel cannot be effected.

The messaging network may be considered to comprise an Originating Device, at least one server and one or more recipients (these may be mobile devices or Email or other recipient types).

A message may be considered to be a textual message or may be some other type of data message or file such as, but not limited to, a picture, music file or document.

The principle of assurance of delivery is applied in all legs of message transmission. Accordingly the originating device may include one or more predefined rules sets, for governing how the message is transmitted. The rule set may include information relating to the period of time the originating device waits before resending the message on the first delivery channel, how often and for how long the retries continue on the first delivery channel before switching to an alternate delivery channel. The message may include a retry counter which is incremented on each attempt of the originating device to deliver the message to the at least one server. The system may enable the user to reconfigure the rule set in accordance with their preferences.

The originating device may display an indicator to the user providing information on the delivery status of the message.

The first delivery channel may be an Internet Protocol (IP) based messaging channel and the message may be an instant message or chat message. Preferably the alternate delivery channel is an SMTP, MIME, POP, NAP or similar messaging channel. Suitably the alternate delivery channel may be an SS7 or similar messaging channel. In instances where an alternate delivery is utilised for delivery of the message the originating device or the at least one server may reformat the message to comply with the alternate delivery channel's messaging standard.

Preferably the originating device is adapted to receive an acknowledgement message from said at least one server on receipt of the message via the first messaging channel.

Where no acknowledgment message is returned to the originating device, the originating device applies the business rules and user settings of the sender to determine the action to take. Typically this may include a defined number of retry attempts and subsequently a switch to the alternate delivery channel on which delivery is to be affected. It may also require the intervention of the user to determine what action to take. Further it may include a delivery by the primary delivery channel to the server with instructions included in the message header to direct the server to switch to the secondary delivery channel.

Once the message has reached the said at least one server it must be routed on to the one or more recipients. The at least one server will first attempt to deliver the message using the delivery channel specified by the user of the originating device.

The server may include one or more predefined rules sets, for governing how the message is transmitted. The rule set may include information relating to the period of time the at least one server waits before resending the message on the first delivery channel, how often and for how long the retries continue on the first delivery channel before switching to an alternate delivery channel. The message may include a retry counter which is incremented on each attempt of the server to deliver the message to the at least one recipient device. The system may enable the user to reconfigure the rule set in accordance with their preferences. Alternately, the server may divest the responsibility to manage retries to the originating device.

Preferably the at least one server is adapted to receive an acknowledgement message from said at least one recipient device on receipt of the message via the first messaging channel. The system may also be configured such that the at least one server notifies the originating device of the receipt of the message by the least one recipient device. This end to end notification is only required to provide assured delivery when the originating device is managing the retry process. Where this is not the case and the at least one server remains in control of the process and maintains the assuredness of delivery it is not mandatory for the receipt acknowledgement to be returned to the originating device. The acknowledgement message may be any suitable format, provided that it contains at a minimum, sufficient information to associate the acknowledgement with the message. The acknowledgement may for example include a serial number, a timestamp, a unique ID or the like. The unique ID may be generated from the serial number and time stamp associated with the receipt of the message.

Alternately the server may simply pass through the acknowledgement of receipt to the originating device. In this approach the originating device takes more responsibility for driving the assurance of delivery to the recipient device.

Where no acknowledgment message is returned to the at least one server, the server applies the business rules and user settings of the sender and recipient to determine the action to take. Typically this may include a defined number of retry attempts and subsequently a switch to the alternate delivery channel on which delivery is to be affected.

The at least one server may be coupled to a database. The server maybe configured to periodically write a log of each attempt to deliver a message, along with network specific information to the database. The database may also be used as a message repository for all messages passing through the delivery server. The system may provide the user with a suitable interface to access all messages sent from and received by the user.

In a further aspect of the present invention there is provided a method for routing messages said method including the steps of:
  receiving at a server a message from an originating device for delivery to the at least one recipient;
  forwarding the message to the at least one recipient device via a first delivery channel
  awaiting receipt of acknowledgement message from said least one recipient device, and in the event that no acknowledgment is received message the server resend the message to said at least one recipient device via an alternate delivery channel.

The method may include the step of re-sending the message via the first delivery channel a predetermined number of times before resending the message via the alternate delivery channel. Suitably the step of resending the message via the first delivery channel includes the step of incrementing a retry counter associated with the message. The method may optionally include the step of initiating at the originating device transfer of the message via an alternate delivery channel in the event of failure to affect delivery via the first delivery channel prior (i.e. originating device has ability of to override retry of first delivery channel).

Suitably the step of forwarding the message via the alternate delivery channel further includes the step of reformatting the message to comply with the channel's messaging standard.

The method may also incorporate processing on the receiving device to identify duplicate messages. In a scenario where poor network reliability exists, messages may be sent on several occasions before the sending at least one server or originating device gets a response back to indicate successful receipt. Where this is due to the receipt failing to be transmitted, rather than the message itself, the result can be duplicate messages arriving on the receiving device. This is addressed by utilising the unique identifier contained in messages as described above. The receiving device looks at the unique identifier in previously received messages and does not re-display a message previously received and displayed.

In a further aspect of the invention an indicator may be displayed to the user indicating the delivery status of a message. In one approach, where message retries are controlled by the originating device, there is preferably a warning to a user attempting to exit from the sending application that a message has not yet been confirmed as being delivered and that retries are still outstanding.

BRIEF DETAILS OF THE DRAWINGS

In order that this invention may be more readily understood and put into practical effect, reference will now be made to the accompanying drawings, which illustrate preferred embodiments of the invention, and wherein.

DESCRIPTION OF EMBODIMENTS OF THE INVENTION

Figure 1:
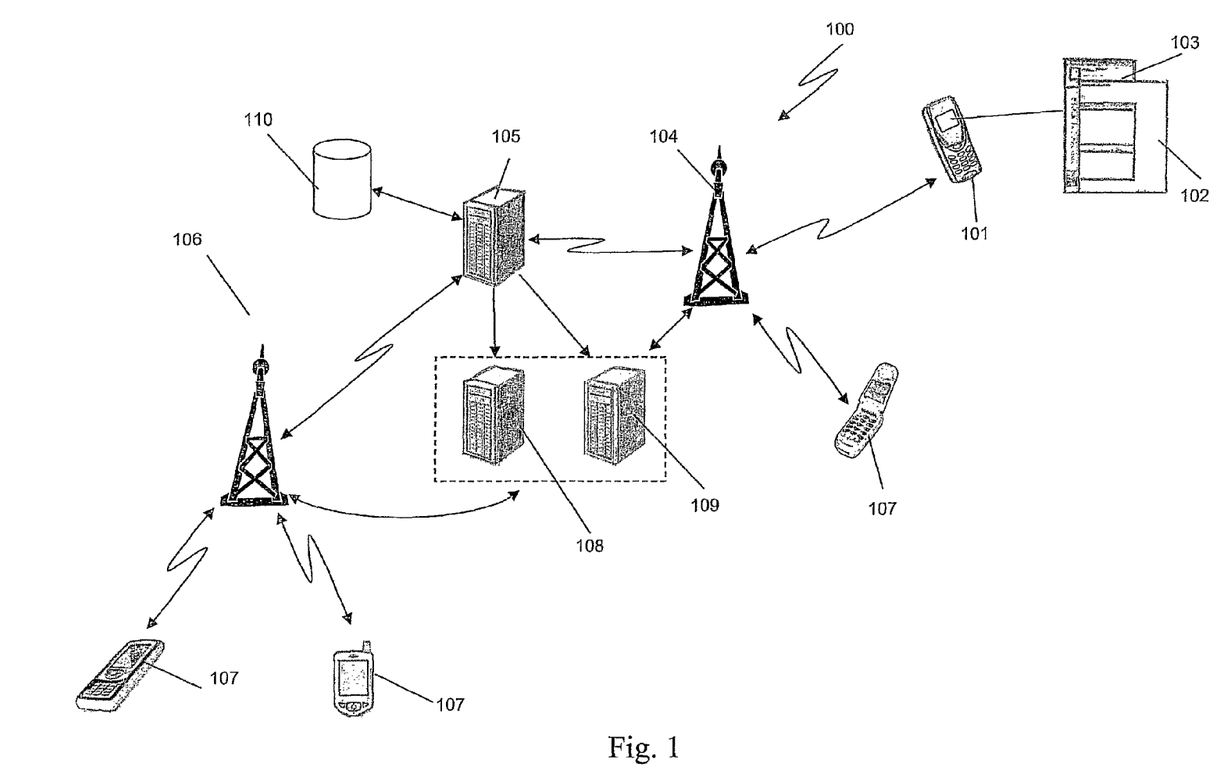
FIG. 1 is a schematic block diagram of an extended message system according to one embodiment of the present invention.

With reference to FIG. 1 there is illustrated a messaging system 100 according to one embodiment of the present invention. In the context of the present invention, a message may be considered to be a textual message or may be some other type of data message or file such as, but not limited to, a picture, music file, or document.

As shown, an originating device 101 (e.g. mobile hand set, PDA, portable computer or the like) is employed by the user to create a message via the devices messaging application 102. In this case the messaging application is a mobile IM application. Once the user has created the desired message, the user then selects one or more recipients 107 from their contact or Buddy List 103. The recipients 107 may be members of the same network 104 or members of a different network 106. Once the recipients 107 are selected the device's messaging application 102 then forwards the message via the network 104 to the delivery server 105 complete with information regarding the intended recipients and the preferred delivery channel to be employed for message to the recipient device(s) 107. The preferred delivery channels can be data (Internet Protocol/IP) based messaging (e.g. instant messaging or chat), SMS, MMS, email or any other defined messaging format. Once the originating device 101 has forwarded the message to the delivery server 105 it expects to receive an acknowledgment message/packet from the delivery server 105 confirming the receipt of the message. The specific format of the acknowledgment is not critical provided it can be readily associated with the original sent message. There are a number of approaches for associating the acknowledgment message with the original sent message. For example the association may be done via the use of a serial number, a timestamp or the like which are used to generate a unique message ID which associates the acknowledgment message with the original sent message.

If the originating device 101 fails to receive an acknowledgment it waits for a predetermined time, based on a predefined rule set, before attempting to resend the message. The predefined rule set not only defines the period of time the device waits before resending the message but they also define how often and for how long the retries will continue. For example the rule set may be configured to allow the sending device 101 a maximum of 10 retries, each retry being at 5 minute intervals after the original attempt to send the message. After exhausting the maximum number of reties the sending device 101 is still unable to complete message delivery, it may then after a predetermined period attempt to affect delivery via an alternate method to route the message to the delivery server 105.

Further, if a user attempts to log off or exit the originating device client application while messages remain outstanding to be sent, the originating device client application will inform user as to the delivery status of the message and provide alternate delivery options prior to completing the log off or exit.

As shown in FIG. 1 the delivery sever 105 in this case is coupled to at least one email server 108 and/or at least one messaging centre (SMSC, MMSC) 109 to provide a plurality of redundant delivery channels. In the event that the message is unable to be routed to the recipient device(s) via the primary delivery channel (i.e. the messages native format) the delivery server will switch to the next preferred delivery format. For example the delivery server 105 may switch from IM to SMS to effect delivery of the message.

Alternatively the originating device 101 may prompt the user to select an alternative delivery channel in the event the message cannot be delivered via the primary deliver channel selected by the user. In some instances a user may select a delivery channel that the server knows is not available for example the user may select IP based messaging but the server knows the receiving device is unavailable to receive this type of message. In this instance the delivery server 105 converts the message to an alternate message format (SMS, email etc) for delivery via an alternate delivery channel (e.g. email gateway 108, SMSC 109).

The primary delivery channel may include a set of instructions included in the message header to direct the server to switch to the secondary delivery channel. Each time a message is sent (and resent) by the delivery server 105, it carries a retry counter, which is counted from 0 (initial delivery) upwards. For each retry, the counter is then incremented to indicate retrials. Based on the rule set configured on the delivery server, the delivery server can then choose to attempt alternative delivery methods for a message based on the retrial count. This allows for converting the message to an SMS, MMS or email after a specified number of retries. In the original iteration, a message will be attempted for delivery via SMS starting from the third retrial.

A log of each attempt to deliver the message along with network information including cell site etc is stored by the server in database 110. In such instances the delivery server 105 may be coupled to the HLR (Home Location Register) of the network 104. When a message fails to be successfully delivered, a log record is written to the database 110. The log not only includes information on the unsuccessful delivery it also includes the HLR information relating to the receiving mobile device. Subsequent analysis of the data thus provided using standard data analysis tools can reveal specific network areas that require maintenance and or upgrades. Such logging can identify specific carrier coverage issues or other network inadequacies. In addition the database 110 can be used as a storage facility for user messages which is discussed in greater detail below.

Figure 2:
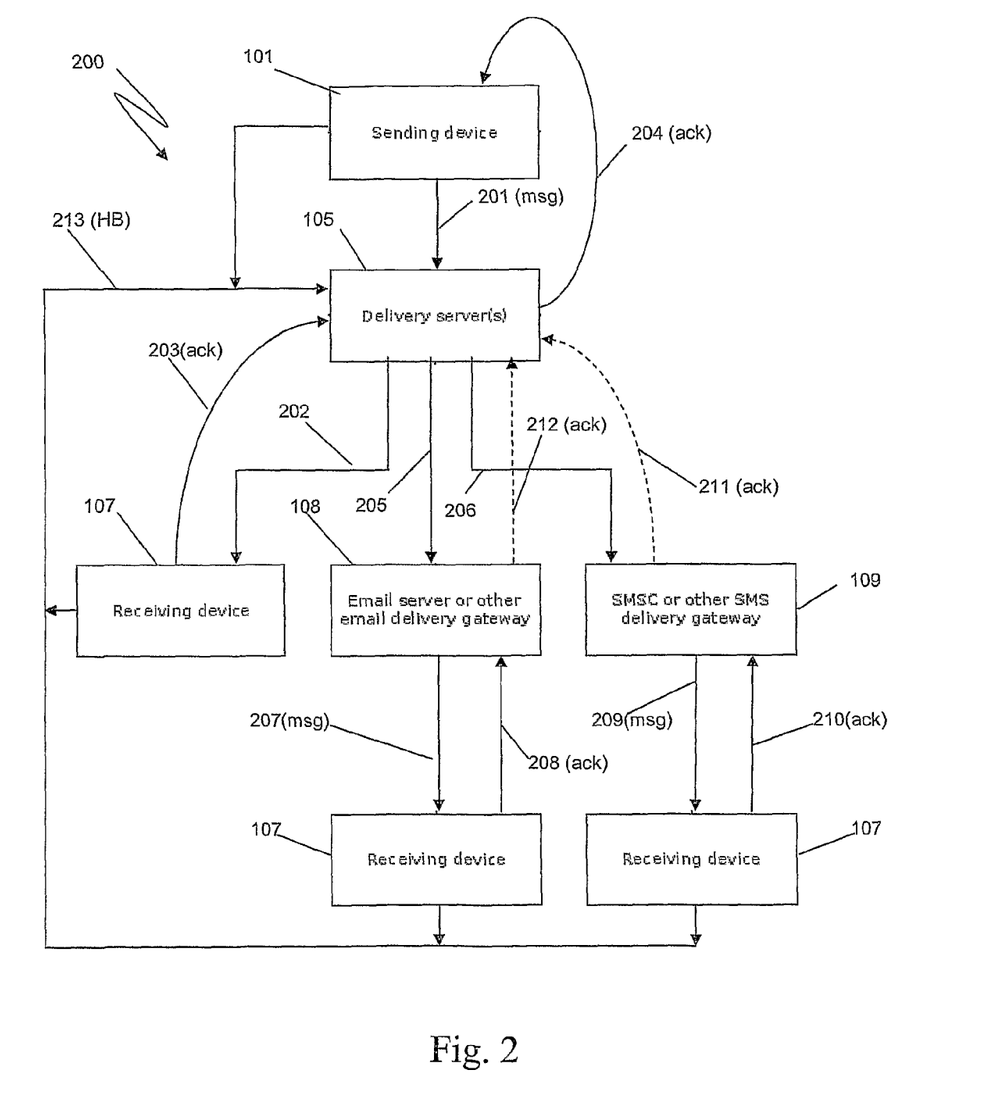
FIG. 2 is a flow chart depicting the signalling between various points in the messaging system according to one embodiment of the invention

FIG. 2 depicts the signalling employed by the messaging system 100 according to one embodiment of the present invention. To effect delivery of the message the delivery server 105 needs to firstly identify the intended recipient(s) 107 and the users preferred delivery channel. Each client device (originating or receiving 101, 107) in the network communicates with the server using a time-based heartbeat transaction 213, this allows the server to track the presence of all devices in the network. In the present example each client device sends a heartbeat to the server every 10 minutes. If the server does not receive a heartbeat when it is expected, it marks that client device as offline.

The heartbeat transaction is not only utilised to show the presence of the client device but the level of services currently available to the client device. For example where the user has indicated a preferred delivery using for example IM communications, the server checks to confirm the recipient 107 is connected to the server and is available to receive messages via the information provided through recipient device's heartbeat. In some instances the receiving device 107 may not be ready or able to receive an IM message, the delivery server 105 then attempts to send the message to each recipient using the applicable alternate delivery channel such as an SMS 209, Email 207 or other suitable messaging format. For each delivery approach, a confirmation/acknowledgment message is expected from the recipient (or delivery agent, as the case may be in the case of SMS and Email) as the message has been delivered. This will then be passed on to the original sender of the message. As mentioned above the specific format of the confirmation message is not critical provided it allows the system to associate the confirmation with the originally sent message.

As shown in FIG. 2, originating device 101 forwards the IM message 201 to the delivery server 105 for delivery to the recipient device 107 via the primary deliver channel 202. The delivery server 105 sends an acknowledgement message back to the originating device 101. The delivery server on-sends the IM message to the recipient device 107. The recipient device 107 then sends back an acknowledgement message 203 to the delivery server 105, the delivery server 105 then optionally advises the sending device 101 of successful end-to-end delivery of the message 204. In the event that the primary delivery 202 channel is unavailable delivery server 105 then attempts to route the message via an alternate delivery channel such as email 205 via email gateway 108, or SMS 206 via SMSC 109.

Where email is the selected alternate delivery route, the delivery server 105 converts the message from its native format to the appropriate email format before forwarding the message 205 to the email gateway. Email gateway 108 then forwards the message 207 to the recipient device 107, the recipient device then sends back an acknowledgement message 208. Similarly where SMS or MMS is selected as the alternate delivery channel the delivery server 105 converts the message form its native format to an appropriately sized SMS packet before forwarding the message the SMSC 109. Message truncation may optionally be performed in this instance however in the current embodiment of the invention as many SMS message packets are sent as are required to deliver the message in its entirety to the recipient device(s) 107. The SMSC 109 then forwards the message 209 to the recipient device 107, the recipient device then the sends back an acknowledgement message 210. In the illustrated example the server does not look for a confirmation for messages 211, 212 (shown in dashed outline) sent via email or SMS via email servers and/or SMSC/SMS gateway since both of these formats are considered acceptably reliable. However, it will be appreciated by those of ordinary skill in the art that such a verification procedure could be readily incorporated into the system.

As mentioned above the routing of messages from the delivery server 105 to the recipient device 107 may be done via a set of predetermined rules implemented on the delivery server 105. The rule set governs the number of retry attempts; the alternate delivery channels to be employed and their order; the time for which retries will be continued; the frequency of retry attempts. The following table shows one example of a rule set which is applied for routing messages with a textual messaging system according to one embodiment of the present invention:

TABLE 1 exemplary rule set for message routing

| Client Device | User Status | Offline Settings | Routing Action |
|---|---|---|---|
| Online | Available or Not-Available | SMS | Attempt to deliver using default method (IP). Retry delivery in the event of non-receipt of confirmation message. Switch to SMS (secondary delivery approach) after expiry of delivery attempts (in current iteration of invention, 3 retries over 15 minutes). |
| Online | Available or Not-Available | Email | Attempt to deliver using default method (IP). Retry delivery in the event of non-receipt of confirmation message. Switch to Email (secondary delivery approach) after expiry of delivery attempts (in current iteration 3 retries over 15 minutes). |
| Online | Invisible | As per above (SMS or Email) | As per above - Invisible status does not affect the delivery approach. |
| Online | Do Not Disturb | n/a | Save message on the server until the user changes their status. |
| Offline | Available or Not-Available | SMS | Sever knows user's client device is not able to receive IP message. Switch immediately to SMS (user defined offline delivery method) |
| Offline | Available or Not-Available | Wake-Up | Sever knows user's client device is not able to receive IP message. Attempt client application wake-up using SS7 or SMS0. Send message using IP channel. Follow normal assured delivery attempts if message receipt confirmation is not received (as for online/sms above) |

TABLE 1-continued exemplary rule set for message routing

| Client Device | User Status | Offline Settings | Routing Action |
|---|---|---|---|
| Offline | Available or Not-Available | Email | Server knows user's client device is not available to receive message. Switch immediately to Email (user defined offline delivery method) |
| Offline | Available or Not-Available | save on server | Server knows user's client device is not available to receive message. Do not attempt to deliver message - save message in file on server for immediate delivery next time this user logs on to a device. |
| Offline | Invisible | SMS or Wake-Up | As for Offline SMS or Wake-up (above). Invisible status does not affect delivery approach. |
| Offline | Invisible | Email or save on server | As for Offline Email (above). Invisible status does not affect delivery approach. |
| Offline | Do Not Disturb | n/a | Save message on the server until the user changes their status. |

In another embodiment of the invention where the message comprises a picture or other file, the alternate delivery channel may be configured as MMS or some other file transfer protocol.

The user may configure the rule set to suit their preferences e.g. via an online interface or the like. The change in rule status is then communicated to the delivery server which modifies the operation of the rule set for the particular user. In the present example the user can define how a message is routed to them based on their status setting, their offline settings and their current network presence. As mentioned above the heartbeat transaction informs the delivery server of the user's presence. However the availability of the user to receive messages is determined based on a combination of the user defined Status setting, their "Offline Settings" and whether they are connected (logged in):

SMS routing when offline, this informs the server to route messages via SMS when the client devices status is set offline;

Email routing which routes messages to email when the user is not logged on to a client device;

Wake-Up which allows the system to wake up the client application on the receiving device using SS7 or SMS0 then present the message to the user;

Save to Server which informs the server to save messages on the server until the user logs back in to their client device Thus availability becomes user defined attribute which enable the user to modify the application of the system's rules set. As shown in table 1 there a number of statuses within the system that a user may choose from depending on whether the user is online or offline. The four main status types are, available, not available, do not disturb and invisible. In Network, if the offline settings chosen by a user allow the timely delivery of a message via an alternate delivery channel, the status chosen by a user is retained when offline. If an in-network user chooses offline settings that do not permit timely delivery such as Email or "save-on-server, their availability will show as "unavailable to communicate" when they are offline. For "Out of Network" users of a client device, limited offline settings are available i.e. save-on-server and Email. Thus an offline out-of-network user is always considered to be "unavailable to communicate".

In addition to the above the system may also present the user with the ability to assign various characteristics to a message, for example Message importance. Message importance can be set to Normal or High by the sender. The message importance is held as data in the message header and is used throughout the network to determine message processing.

If the user selects High importance, message delivery rules through the network, server infrastructure and receiving device, treat the message differently. Typically High Importance messages are charged by the carrier at a premium rate.

For High Importance messages the following changes to normal processing under the rule set occur:

retries from the sending device to the server occur every 1 minute for a maximum of 3 retries. In the event of a failure to send the message the sender is alerted on the sending device and given options to continue or switch to an alternate delivery channel.

retries from the server to the receiving device occur every 1 minute for a maximum of 3 retries before switching to an alternate channel High Importance messages will never only be routed to Email. If the receiver has specified Email in their Offline Settings, then messages will be copied to Email but also routed to SMS.

on the receiving device a special alert tone will sound for a high importance message.

on the receiving device a request will be shown to the user requesting acknowledgement of receipt and this will be sent as a message back to the original sender (with time/date acknowledged)

Messages will be tagged on database 110 (discussed below) as High Importance

As briefly mentioned above the database 110 may be used as a remote storage facility. This "StoreIT" functionality provides a full message archive facility of all messages sent to and from the delivery server 105. Access to messages is provided via a website. A user can log in and then use extensive search facilities and tagging to access their messages. Sufficient storage is provided such that the user need never delete a message.

The delivery server writes each message sent and received in an asynchronous process to a data storage facility 110. Messages are typically written separately for each sender/recipient. Storage requirements can be reduced by writing a single copy of a message and using links to associate that message with multiple send/receivers. Tradeoffs would be accepted in this approach with slow search performance.

Tagging of message can be performed automatically if for example the message contains certain characteristics:

Contain a web link

Contain a number that meets criteria to suggest it is a phone number

Contain an address (based on a database of key words such as "street", "apartment", "st.", "apt", etc.)

The "StoreIT" user interface also provides the ability via a PC version of the messaging client, to forward and reply to messages. The web interface may include the following:

the ability to Log in using same user-ID and password as the users mobile messaging application;

Access to all sent and received messages;

Message meta data including time/date sent, recipients/sender information

Tagging of messages (user selectable tags as well as automated tags, for example tagging messages that contain web links or numbers)

Messaging options (reply to the message, send a new message etc)

Access to the Buddy List

Message archive management (deleting some or all messages for selected or all recipients)

User settings (turn off StoreIT, turn off for specific recipients, turn on for specific recipients etc)

It is to be understood that the above embodiments have been provided only by way of exemplification of this invention, and that further modifications and improvements thereto, as would be apparent to persons skilled in the relevant art, are deemed to fall within the broad scope and ambit of the present invention described herein. In particular, the following additions and/or modifications (non-exhaustive) can be made without departing from the scope of the invention:

The management of retries may be performed by the originating device 101 instead of the delivery server 105.

The acknowledgement of receipt may by-pass the delivery server 105. In this approach, the originating device 101 is configured to provide the assurance of delivery to the recipient device 107.

The originating device 101 may be configured to display an indicator to the user providing information on the delivery status of the message.

The originating device 101 may be configured to select an alternate delivery channel in the event that the delivery of the message via the first delivery channel cannot be effected.

In instances where an alternate delivery is utilised for delivery of the message either the originating device or the at least one server may reformat the message to comply with the alternate delivery channel's messaging standard.

When no acknowledgement message is returned to the originating device, in addition to the business rules and user settings as described in the embodiments, the primary delivery channel may be further configured to send a message to the delivery server 105; the delivery server 105 including instructions in the message header to direct the server to switch to the secondary delivery channel.

An indicator may be displayed to the user to indicate the delivery status of a message. As an example, where message retries are controlled by the originating device, there is a warning to a user attempting to exit from the sending application that a message has not yet been confirmed as being delivered and that retries are still outstanding.

The invention claimed is:

1. A messaging system including:

at least one server configured to receive a message from an originating device for delivery to at least one recipient device via a first delivery channel; said at least one recipient device being configured to periodically send a recipient device availability and level of service information to the at least one server;

wherein said recipient device availability changes due to at least one of a plurality of user defined settings made by a recipient device user;

wherein the at least one server, in the event that delivery of the message via the first delivery channel cannot be effected, is further configured to select an alternate delivery channel to effect delivery of the message based on a check of both a non-detection of the recipient device availability to receive the message and on a case of no reception of the level of service information periodically sent from the recipient device; and wherein duplicate messages on the recipient device are not displayed to users based on a unique identifier, said unique identifier generated from a serial number and a time stamp associated with receipt of the message.

2. The messaging system of claim 1 wherein the first delivery channel is an Internet Protocol channel and the message is an instant message.

3. The messaging system of claim 1 wherein the first delivery channel is selected from at least one of SMTP, MIME, POP, IMAP channel and said message is an email message.

4. The messaging system of claim 1 wherein the first delivery channel is an SS7 channel and the message is an SMS or MMS.

5. The messaging system of claim 1 wherein the server is configured to reformat the message to comply with a messaging standard of the alternate delivery channel.

6. The messaging system of claim 1 wherein the at least one server is adapted to receive an acknowledgement message from said at least one recipient device on receipt of the message via the first delivery channel, wherein said at least one server notifies the originating device of the receipt of the message by the least one recipient device.

7. The messaging system of claim 6 wherein the originating device may instruct the server to immediately send the message via the alternate delivery channel on failure to receive the acknowledgement message.

8. The messaging system of claim 6 wherein the acknowledgement message includes a serial number, a timestamp or a unique ID which associates the acknowledgement message with the message sent by the originating device.

9. The messaging system of claim 1 wherein the server further includes one or more predefined rules sets, for governing how the message is transmitted to the at least one recipient device.

10. The messaging system of claim 9 wherein the predefined rule set includes information relating to the period of time the server waits before resending the message on the first delivery channel and the maximum amount of times the server is to retry delivery of the message on the first delivery channel before switching to an alternate delivery channel.

11. The messaging system of claim 10 wherein the message includes a retry counter which is incremented on each attempt of the server to deliver the message to the at least one recipient device.

12. The messaging system of claim 11 wherein the at least one server is configured to periodically write a log of each attempt to deliver a message, along with network specific information to a database.

13. The messaging system of claim 12 wherein a copy of all messages passing through the at least one server are stored in the database for later retrieval by a user.

14. A method for routing messages said method including the steps of:
   receiving at a server a message from an originating device for delivery to at least one recipient device;
   receiving at the server a recipient device availability and level of service information from the at least one recipient device, wherein said at least one recipient device is configured to periodically send the recipient device availability and level of service information to the at least one server; wherein said recipient device availability changes due to at least one of a plurality of user defined settings made by a recipient device user;
   forwarding the message to the at least one recipient device via a first delivery channel
   awaiting receipt of an acknowledgement message from said at least one recipient device, and in the event that no acknowledgment message is received, the at least one server selects an alternate delivery channel to resend the message to said at least one recipient device based on a check of both a non-detection of the recipient device availability to receive the message and on a case of no reception of the level of service information periodically sent from the at least one recipient device; and
   wherein duplicate messages on the recipient device are not displayed to users based on a unique identifier, said unique identifier generated from a serial number and a time stamp associated with receipt of the message.

15. The method of claim 14 wherein the first delivery channel is an Internet Protocol (IP) channel and the message is an instant message.

16. The method of claim 14 wherein the first delivery channel is selected from at least one of SMTP, MIME, POP, IMAP channel and said message is an email message.

17. The method of claim 14 wherein the first delivery channel is an SS7 channel and the message is an SMS or MMS.

18. The method of claim 14 wherein the server is configured to reformat the message to comply with a messaging standard of the alternate delivery channel.

19. The method of claim 14 further including the step of resending the message via the first delivery channel a predetermined number of times before attempting to send the message via the alternate delivery channel.

20. The method of claim 19 wherein the step of resending the message via the first delivery channel includes the step of incrementing a retry counter associated with the message.

21. The method of claim 14 wherein the server stores a copy of all messages for later retrieval by a user.

22. The method of claim 14 wherein the server automatically tags messages based on system defined content rules as well as user defined rules for later searching by the user.

23. A method for routing messages said method including the steps of:
   receiving at a server a message from an originating device for delivery to at least one recipient device;
   receiving at the server, a recipient device availability and level of service information from the at least one recipient device, wherein said at least one recipient device is configured to periodically send the recipient device availability and level of service information to the at least one server; wherein said recipient device availability changes due to at least one of a plurality of user defined settings made by a recipient device user;
   forwarding the message to the at least one recipient device via a primary delivery channel;
   awaiting receipt of an acknowledgement message from said at least one recipient device and forwarding the acknowledgement back to the originating device and, in the event that no acknowledgment message is received by the originating device, the originating device resends the message to said server indicating that the message be routed to the recipient device using an alternate delivery channel, wherein the originating device selects the alternate delivery channel based on a check of both a non-detection of the recipient device availability to receive the message and on a case of no reception of the level of service information periodically transmitted from said at least one recipient device; and
   wherein duplicate messages on the recipient device are not displayed to users based on a unique identifier, said unique identifier generated from a serial number and a time stamp associated with receipt of the message.

24. The method of claim 23 wherein the primary delivery channel is an Internet Protocol (IP) channel and the message is an instant message.

25. The method of claim 23 wherein the primary delivery channel is selected from at least one of SMTP, MIME, POP, IMAP channel and said message is an email message.

26. The method of claim 23 wherein the primary delivery channel is an SS7 channel and the message is an SMS or MMS.

27. The method of claim 23 wherein the server is configured to reformat the message to comply with a messaging standard of the alternate delivery channel.

28. The method of claim 23 further including the step of resending the message via the primary delivery channel a predetermined number of times before attempting to send the message via the alternate delivery channel.

29. The method of claim 28 wherein the step of resending the message via the primary delivery channel includes the step of incrementing a retry counter associated with the message.

30. The method of claim 23 wherein the server stores a copy of all messages for later retrieval by a user.

31. The method of claim 23 wherein the server automatically tags messages based on system defined content rules as well as user defined rules for later searching by the user.

32. The method of claim 23 wherein the originating device displays an indicator to the user as to the delivery status of a message.

33. The method of claim 23 wherein the originating device will warn a user that a message has not been delivered before performing a shut down or log out operation.

* * * * *